(12) United States Patent
Reiter et al.

(10) Patent No.: US 9,841,351 B2
(45) Date of Patent: Dec. 12, 2017

(54) METHOD FOR SIMULATING THE BEHAVIOR OF THE VEHICLE AND CHASSIS DYNAMOMETER

(71) Applicant: KRISTL, SEIBT & CO. GESELLSCHAFT M.B.H., Graz (AT)

(72) Inventors: René Reiter, St. Sebastian (AT); Christoph Schwaerzler, Lingenau (AT); Michael Palzer, Graz-St. Peter (AT); Roland Margelik, Rohrbach-Steinberg (AT)

(73) Assignee: Kristl, Seibt & Co. Gesellschaft m.b.H., Graz (AT)

( * ) Notice: Subject to any disclaimer, the term of this patent is extended or adjusted under 35 U.S.C. 154(b) by 0 days.

(21) Appl. No.: 15/304,262

(22) PCT Filed: Apr. 15, 2015

(86) PCT No.: PCT/AT2015/050095
§ 371 (c)(1),
(2) Date: Oct. 14, 2016

(87) PCT Pub. No.: WO2015/157788
PCT Pub. Date: Oct. 22, 2015

(65) Prior Publication Data
US 2017/0038274 A1 Feb. 9, 2017

(30) Foreign Application Priority Data
Apr. 16, 2014 (AT) ............... A 50287/2014

(51) Int. Cl.
*G01M 13/02* (2006.01)
*G01M 17/04* (2006.01)

(52) U.S. Cl.
CPC .......... *G01M 13/025* (2013.01); *G01M 17/04* (2013.01)

(58) Field of Classification Search
CPC .. G01M 13/02; G01M 13/025; G01M 13/027; G01M 17/04; G01M 17/021
See application file for complete search history.

(56) References Cited

U.S. PATENT DOCUMENTS 3,057,192 A * 10/1962 Huffman ........... G01M 17/0072
310/93
4,466,294 A * 8/1984 Bennington ........ G01M 15/044
73/116.05

(Continued)

FOREIGN PATENT DOCUMENTS

| AT | 508031 B1 | 10/2010 |
|---|---|---|
| DE | 10212255 A1 | 10/2003 |
| DE | 102004021645 A1 | 12/2005 |
| DE | 102012101613 A1 | 6/2013 |
| EP | 0094570 B1 | 7/1986 |
| EP | 1037030 A2 | 9/2000 |
| EP | 1085312 A2 | 3/2001 |
| EP | 2161560 A2 | 3/2010 |
| EP | 2602602 A1 | 6/2013 |
| WO | 2013059547 A1 | 4/2013 |
| WO | 2013187453 A1 | 12/2013 |

OTHER PUBLICATIONS

Pillas, J. et al, "Model-based load change reaction optimization using vehicle drivetrain test beds," Proceedings of the 2014 Internationales Stuttgarter Symposium, Mar. 18, 2014, Stuttgart, Germany, 11 pages.
International Bureau of WIPO, International Preliminary Report on Patentability Issued in Application No. PCT/AT2015/050095, dated Oct. 20, 2016, WIPO, 15 pages.
Bauer, R., "New Methodology for Dynamic Drive Train Testing," SAE Technical Paper 2011-26-0045, Jan. 19, 2011, SIAT, India, 6 pages.
ISA European Patent Office, International Search Report Issued in Application No. PCT/AT2015/050095, dated Aug. 20, 2015, WIPO, 3 pages.

*Primary Examiner* — Jewel V Thompson
(74) *Attorney, Agent, or Firm* — McCoy Russell LLP

(57) ABSTRACT

The invention relates to a chassis dynamometer and to a method for simulating the behavior of the vehicle in a chassis dynamometer, comprising an actuator for transferring a longitudinal force to the vehicle, a rotational movement carried out by a wheel or a drive train of the vehicle being measured, a corresponding longitudinal acceleration being determined from the measured rotational movement and the actuator being controlled in accordance with the determined longitudinal acceleration based on the measurement.

19 Claims, 4 Drawing Sheets

(56) References Cited

U.S. PATENT DOCUMENTS

| | | | | |
|---|---|---|---|---|
| 5,450,748 A * | 9/1995 | Evans | ............... | G01M 17/0072 73/116.06 |
| 5,542,290 A * | 8/1996 | Suzuki | .............. | G01M 17/0072 73/116.06 |
| 5,663,494 A * | 9/1997 | Clayton, Jr. | ............... | G01L 3/22 73/116.06 |
| 6,257,054 B1 * | 7/2001 | Rostkowski | .............. | G01L 3/22 73/116.08 |
| 6,360,591 B1 * | 3/2002 | Carley | .............. | G01M 17/0072 73/116.06 |
| 6,457,351 B1 * | 10/2002 | Yamamoto | ........ | G01M 17/0072 73/116.05 |
| 9,223,748 B2 * | 12/2015 | Konishi | ................. | G06F 17/00 |
| 2002/0018982 A1 * | 2/2002 | Conroy | ................. | G09B 9/042 434/62 |
| 2006/0042365 A1 * | 3/2006 | Bond | .................... | G09B 9/042 73/116.06 |
| 2013/0160537 A1 | 6/2013 | Preising et al. | | |

* cited by examiner

METHOD FOR SIMULATING THE BEHAVIOR OF THE VEHICLE AND CHASSIS DYNAMOMETER

CROSS REFERENCE TO RELATED APPLICATIONS

The present application is a U.S. National Phase of International Patent Application Serial No. PCT/AT2015/050095, entitled "METHOD FOR SIMULATING THE BEHAVIOUR OF A VEHICLE AND CHASSIS DYNAMOMETER," filed on Apr. 15, 2015. International Patent Application Serial No. PCT/AT2015/050095 claims priority to Austrian Patent Application No. A 50287/2014, filed on Apr. 16, 2014. The entire contents of each of the above-mentioned applications are hereby incorporated by reference for all purposes.

TECHNICAL FIELD

The invention relates to a method for simulating the behavior of a vehicle during driving in a chassis dynamometer comprising an actuator for transferring a longitudinal force to the vehicle, with a rotational movement carried out by a wheel or a drive train of the vehicle being measured, as well as to a corresponding chassis dynamometer for simulating the behavior of a vehicle during driving having an actuator for transferring a longitudinal force to the vehicle and having a measuring device for measuring a rotational movement of a wheel or of a drive train of the vehicle.

BACKGROUND AND SUMMARY

More specifically, the present invention relates to a method in which a main drive train of a vehicle to be tested is connected to at least one load machine. If the main drive train propels multiple axle drives, individual load machines connected by means of side shafts may brake and propel independently from one another in order to simulate driving resistances and/or acceleration moments or delay moments. Control of the load machine(s) is usually based on a simulation calculation of the vehicle, down to the individual tires if desired. In particular, the measurement of the rotational movement refers to a measurement of torque and/or speed taken in this conjunction. Examples for methods and/or corresponding dynamometers which the invention intends to improve have already been described in AT 508 031 B1 or Bauer R., "New Methodology for Dynamic Drive Train Testing" in Proceedings of the Symposium on International Automotive Technology, pp. 1-6, 2011, reference to which is made in particular with regard to control of the load machines in the context of methods and/or a chassis dynamometer of the present type.

In recent years, the technology of these dynamometers for the drive train has developed to such an extent that on a so-called full-vehicle chassis dynamometer the test object is subject to the exact same loads as on the road. This allows "vehicle application on the dynamometer" by which, instead of time- and cost-intensive driving tests on a test track, the same tests may be performed on the dynamometer (see Pillas J., Kirschbaum F., Jakobi R., Gebhardt A., Uphaus F.: "Model-based load change reaction optimization using vehicle drivetrain test beds", Tagungsband des 14. Internationalen Stuttgarter Symposiums, pp. 857-867, 2014).

Here, vehicle applicators criticise that the accelerations of the vehicle as a response to actions of the test object (accelerating, braking, changing gears etc.) on the dynamometer are naturally different from actual driving on roads. The subjective feel ("seat-of-the-pants feel") of the vehicle applicators, in particular, is thus different on the dynamometer as during actual driving on roads.

Naturally, the vehicle on the dynamometer cannot perform the same movements as on the road. In addition, the vehicle must have a good mechanical connection to the load machines (and/or roller machines). If one intended to simulate the acceleration via tilting, as in a flight simulator, this would require moving the entire trip rail including the vehicle and the load machines, which is made impossible by the large mass.

In a different context, namely dynamometers for examining the impact of forces and torques acting onto an undercarriage via wheels and wheel suspensions, EP 2 602 602 A1 already suggests providing translational actuators and connecting the drive assemblies to the wheels of the test object via double-joint shafts. In this case, a test load, for example in the form of a longitudinal force, is applied to the wheels by the actuators. In this type of dynamometer, however, the translational actuators are exclusively reconstructing predetermined values for distance or force. At the most, a coordination not specified in more detail of the predetermined values for the test load and a drive torque and/or drive speed is provided.

In other known dynamometers of this type having translational actuators, e. g. according to DE 102 12 255 A1, DE 10 2012 101 613 A1 or EP 0 094 570 B1, a rotation of the wheels and/or side shafts of the drive train is virtually irrelevant.

An acceleration of the vehicle as a response to actions of the test object on the dynamometer comparable to the vehicle's behaviour during actual driving on roads is not provided in the known methods and dynamometers.

As a consequence, it is the object of the invention to provide a method of the initially mentioned type which allows a subjective feel which is close to reality, i. e. similar to a driving test on a test track, for a person situated within a vehicle. Preferably, the behaviour of the vehicle is simulated close to reality during accelerating, braking, changing gears etc. of the respective test object.

To achieve this object, it is provided, according to the invention, that in the method of the initially mentioned type a corresponding longitudinal acceleration is determined from the measured rotational movement and the actuator is controlled in accordance with the longitudinal acceleration which is determined based on the measurement. According to this and according to the invention, it is provided that in a chassis dynamometer of the initially mentioned type a control device, which is connected to the measuring device and to the actuator, is configured to determine a corresponding longitudinal acceleration from a measured rotational movement of the wheel obtained from the measuring device and to transmit a control signal to the actuator in accordance with the determined longitudinal acceleration. Control of the actuator, which is formed by a linear motor, for example, is not performed on the basis of an arbitrary predetermined test load or a merely calculated simulated acceleration, but dynamically, based on a measurement of the rotational movement of a wheel or a drive train of the vehicle, i. e. in particular based on a direct or indirect measurement of the torque carried out by the wheel, and preferably in real-time ("on-line"). In this way, a realistic response of the test object to the vehicle control performed by the vehicle (accelerating, braking, changing gears etc.) may be simulated in an advantageous manner. In general, a "vehicle application on the dynamometer" is useful and possible only if the test object responds to the physically caused impact on the wheel and/or the drive train in the right way—i. e. according to the real test object—since it is only here that changes, for example of the motor control device, have an impact on the acceleration being calculated on-line from the vehicle model and being transferred into the test object by the actuator, so these changes have an impact on the subjective feel of the vehicle applicator. On the other hand, a subjective feel is basically possible if predetermined values for distance or force are used, as is the case in the prior art, but in general this feel does not correspond to the actual and/or real behavior of the vehicle so vehicle application is hardly useful.

The exact longitudinal acceleration the vehicle would perform on the road can only be used to a very limited extent on the dynamometer since, in a full-throttle scenario, for example, this would result in a distance of over 100 m covered in only a few seconds. As has been revealed for longer tests, for controlling the actuator the determined longitudinal acceleration may be converted into a subjective acceleration in order to shorten a covered translational distance with respect to a distance resulting from the determined longitudinal acceleration. The conversion into a subjective acceleration exploits the fact that in general the acceleration perceived by a person deviates from the physical acceleration. Because of this, it is preferable to choose a conversion for approximating a subjectively correct impression of acceleration while minimising the distance covered by the test object.

For example, it has been proven favorable for low-frequency portions of the determined longitudinal acceleration to be reduced during conversion of the acceleration. This approach is based on the knowledge that only or mainly high-frequency portions of the acceleration are relevant for subjective human perception. This means that relative abrupt changes of acceleration are perceived primarily while consistent acceleration or slow changes are perceived to a significantly lower extent—if at all. In this context, portions in the range of 1-2 Hz and below, in particular, are considered low-frequency portions.

Furthermore, it is advantageous if the determined longitudinal acceleration is modified by a high-pass filter, for example a high-pass filter designed according to Bessel or Butterworth or preferably a first-order high-pass filter, for the conversion into the subjective acceleration, with a time constant of the high-pass filter preferably being between 0.01 and 1 second, in particular about 0.1 seconds. Such a filtering of the longitudinal acceleration may be implemented relatively efficiently and allows responding in real-time and avoiding noticeable latencies compromising the subjective perception. According to this, it is advantageous for the control device in the present chassis dynamometer to comprise a high-pass filter for the determined longitudinal acceleration, for example a high-pass filter designed according to Bessel or Butterworth or preferably a first-order high-pass filter, with a time constant of the high-pass filter preferably being between 0.01 and 1 second, in particular about 0.1 seconds.

In order to further reduce the distance actually covered by the vehicle within the dynamometer, it is favourable for the displacement of the actuator to be set to a constant nominal position, in particular in the middle of an intended travel of the actuator. In this way, multiple accelerations, which are subsequent but temporally interrupted and/or consistent over certain segments, may be simulated in the same direction and/or with the same algebraic sign within an overall shorter translational path, in particular within the same translational segment. In this case, the translational segment is covered according to the acceleration, multiple times and in rapid succession in the same direction, wherein between the accelerations the vehicle is moved back to the starting position, the constant nominal position if applicable, relatively slowly and thus unnoticeably by the position controller. Basically, the nominal position may be selected such that the accelerations to be expected may be put into effect. In the middle of the intended travel, accelerations in both directions (forwards or backwards and/or accelerating or braking) are possible likewise. If different accelerations and/or accelerations of different velocities are expected depending on the direction, the nominal position may be adapted according to these expectations, of course.

A particularly simple and reliable control may be obtained if the displacement of the actuator is controlled by a position controller, preferably having a rise time between 0.05 and 5 seconds, in particular having a rise time of about 0.5 seconds. By the same token, it may be provided that in the proposed chassis dynamometer the control device comprises a position controller for controlling the displacement of the actuator, preferably comprising a rise time between 0.05 and 5 seconds, in particular about 0.5 seconds. A common PID controller or a cascade controller, for example one having a velocity controller formed by a PI controller and an upstream displacement controller formed by a P controller, may be used as the position controller.

In cooperation with the position control circuit it is favorable for a portion proportional to the subjective acceleration to act on the position control circuit as a disturbance, in particular if a portion proportional to the subjective acceleration is added to a control variable of the position control circuit. Preferably a force, which corresponds to the subjective acceleration, with a known vehicle mass and a portion associated to a single actuator in case of multiple actuators, is added to a force predetermined for the actuator, for example, by a position controller. This means that an acceleration portion of the position control circuit overlies the subjective acceleration performed by the actuator, i. e. the low-frequency portions of the determined longitudinal acceleration are replaced by the control variables of a position controller. Preferably, the position controller is not set as tight as possible so the additional force corresponding to a subjective acceleration may also be implemented by the actuator.

BRIEF DESCRIPTION OF THE FIGURES

The invention is explained in more detail below by means of particularly preferred exemplary embodiments, however with no intention of being limited to them, and with reference to the drawings. Individually, in the drawings.

DETAILED DESCRIPTION

Figure 1:
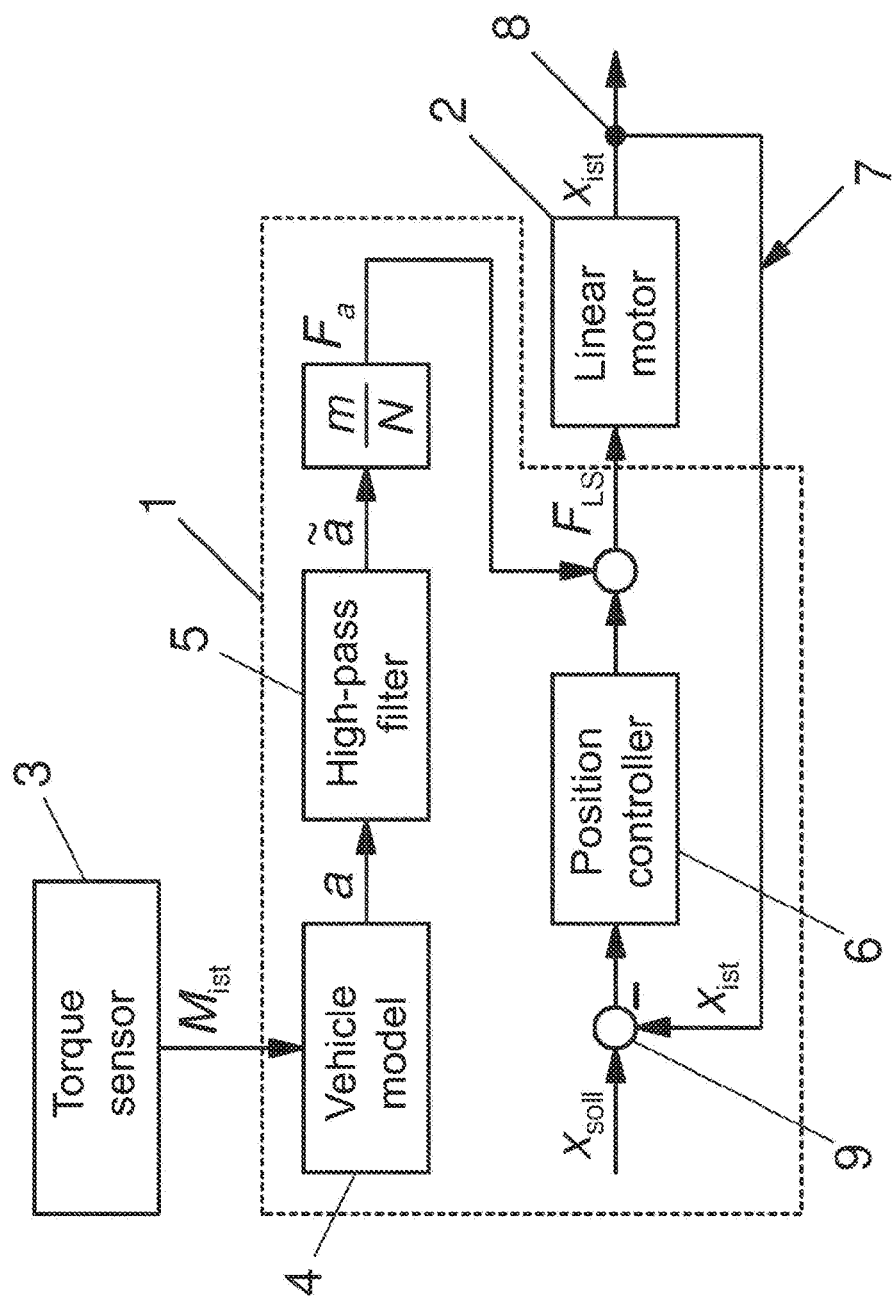
FIG. 1 shows a schematic block diagram of a control device for an actuator for transferring a longitudinal force to a vehicle.

In FIG. 1, the control device 1 for an actuator 2 of a full-vehicle chassis dynamometer is illustrated schematically. The actuator is formed by a linear motor for transferring a longitudinal force to a vehicle connected to the chassis dynamometer. For measuring a rotational movement of a drive train or a wheel of the vehicle the control device 1 is connected to a measuring device 3 in the form of a torque sensor. First of all, the control device 1 is configured to determine a longitudinal acceleration a of the vehicle corresponding to the measured torque value $M_{ist}$ according to a vehicle model 4. Then, the longitudinal acceleration a determined in this way is modified in a high-pass filter 5 wherein low-frequency portions of the acceleration a are suppressed so the filtered acceleration ã corresponds to a subjective acceleration. The subjective acceleration ã is weighted appropriately, i. e. multiplied by a vehicle mass m and divided by a number N of linear motors (aligned substantially in parallel) on the dynamometer. The resulting subjective acceleration force $F_a$ is added as a quasi-disturbance at an output of a position controller 6 to its control variable for providing the desired air gap force $F_{LS}$ of the actuator 2. The position controller 6 is configured to reset the vehicle virtually unnoticeably and thus operates only with slow and/or low-frequency accelerations. Effectively, the low-frequency portions of the determined longitudinal acceleration a attenuated or removed by the high-pass filter 5 are thus replaced by the control variable of the position controller 6. Here, the entire processing starting from the measurement of the torque is performed in real-time, i. e. without noticeable delays. The position controller 6 is part of a position control circuit 7 including a position measuring 8 of the actuator 2, which determines the current position $x_{ist}$ of the slider of the actuator 2, and including a difference member 9, which compares the current position $x_{ist}$ to a consistent, given nominal position $x_{soll}$ and transmits the difference corresponding to a displacement of the slider from the nominal position $x_{soll}$ to the position controller 6. The position controller 6 uses the received displacement to determine a control variable for the air gap force $F_{LS}$ of the actuator 2.

Figure 2:
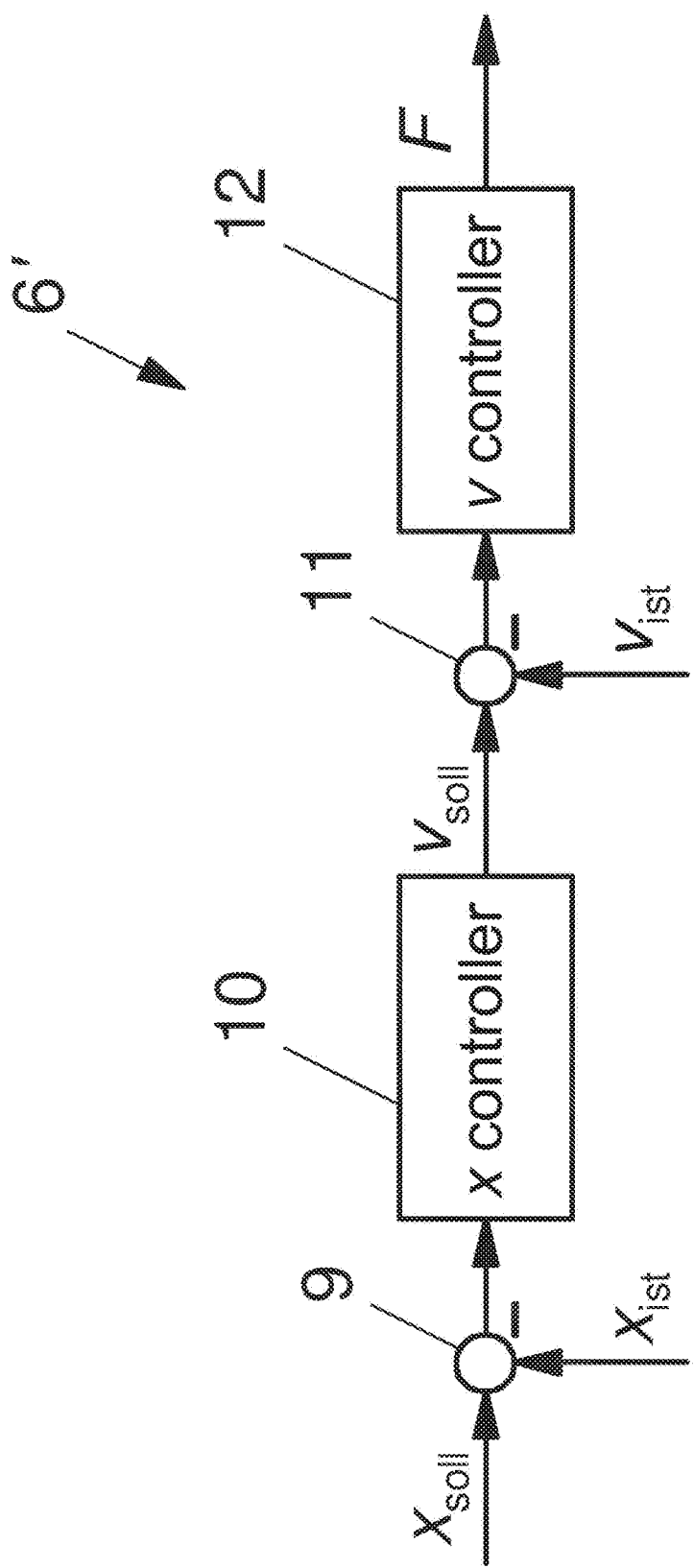
FIG. 2 shows a schematic block diagram of a position controller for use in a control device according to FIG. 1.

The position controller 6' illustrated schematically in FIG. 2 is a cascade controller, which determines the control variable F for the air gap force $F_{LS}$ of the actuator 2 from a displacement and a current moving velocity $v_{ist}$ of the slider of the actuator 2. Here, a nominal velocity $v_{soll}$ of the slider is determined by means of the displacement transmitted by the difference member 9 in a displacement controller 10. In this case, the displacement controller 10 is a P controller with its amplification being set such that the actuator 2 is only loaded partially. The resulting nominal velocity $v_{soll}$ is then compared in a further difference member 11 to a measured current velocity $v_{ist}$ of the slider, and the differential velocity is transmitted to the separate velocity controller 12. In this case, the velocity controller 12 is a PI controller with its reset time being selected such that the forces given by the position controller 6' as control variable F are not or hardly perceived by persons situated in the vehicle, i. e. the position controller 6' only causes low-frequency portions of an acceleration of the vehicle.

Figure 3:
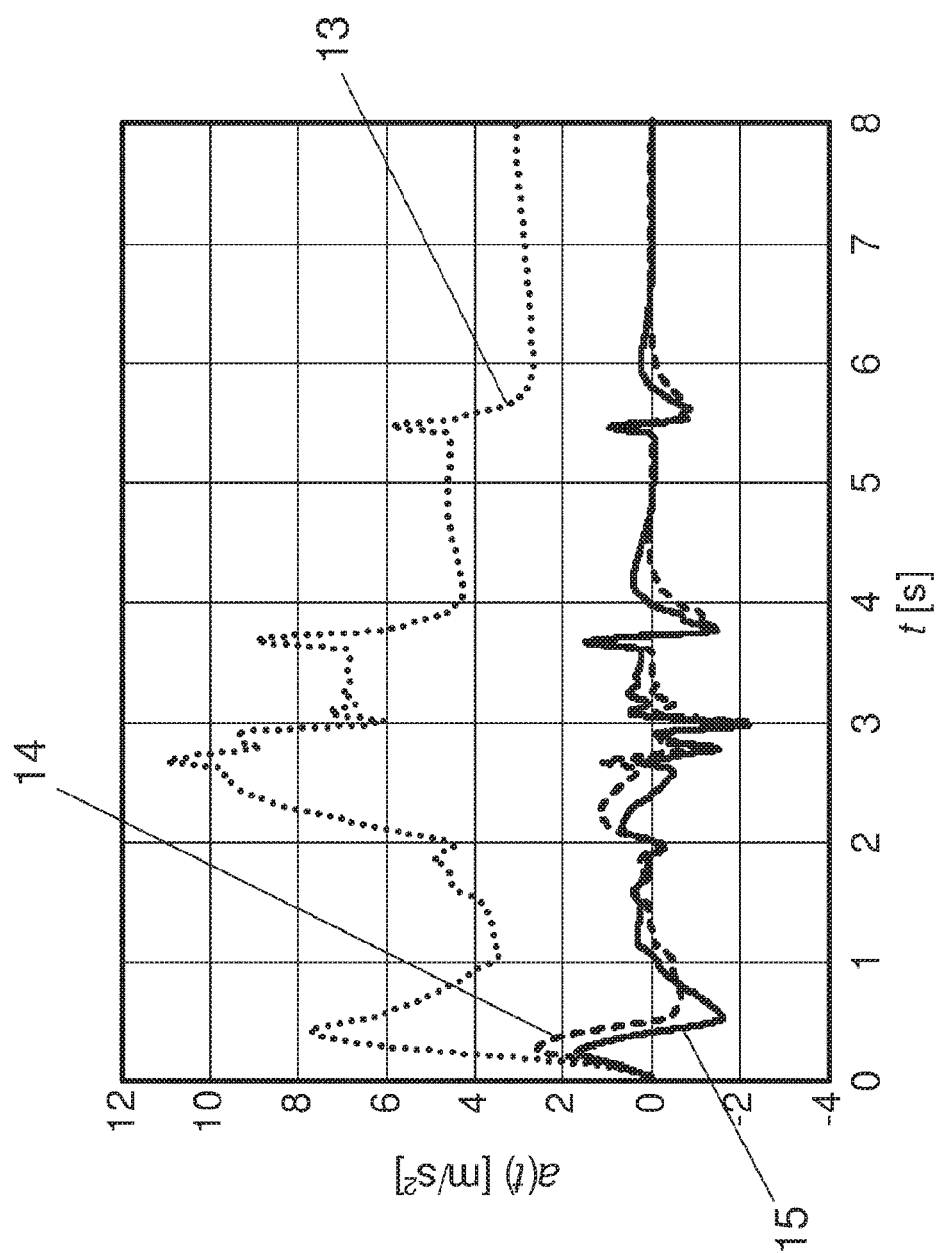
FIG. 3 shows a diagram of the time courses of a determined longitudinal acceleration, a corresponding subjective acceleration and an actual acceleration on the dynamometer in conjunction with the control according to FIG. 1.
Figure 4:
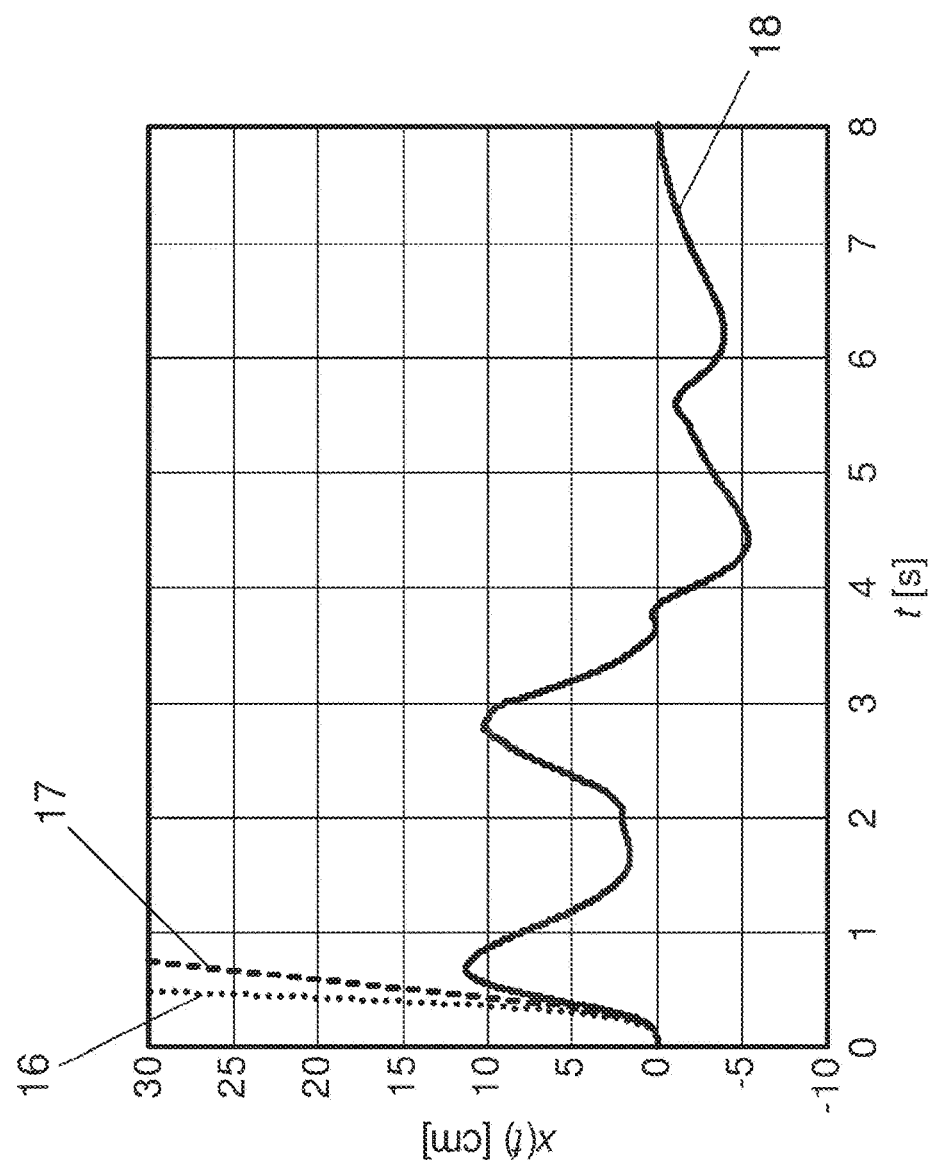
FIG. 4 shows a diagram of the time courses of the distances covered corresponding to each of the individual time courses of acceleration according to FIG. 3.

In FIG. 3, a full-throttle scenario starting from standstill is illustrated exemplary, wherein the course 13 illustrated by a dotted line represents the determined longitudinal acceleration a, the course 14 illustrated by a dashed line represents the subjective acceleration ã and the course 15 illustrated by a continuous line represents the acceleration that is actually experienced by the vehicle in the dynamometer, each as a function of the time t in a time frame of eight seconds. As can be seen from course 13, the determined longitudinal acceleration a is positive within the entire time frame, having a maximum value of about 11 m/s² at about 2.6 seconds, i. e. the vehicle and/or vehicle drive accelerates—as expected in a full-throttle scenario—without interruptions in the same direction during the eight seconds. A doubled integration of the illustrated courses 13, 14, 15 over the shown time frame under the assumption that the vehicle is at a standstill at the start of the time frame gives the courses 16, 17, 18 shown in FIG. 4 for the covered distance x(t) as a function of the time t, wherein the same line structure has been used for each of the courses 16, 17, 18 as for the original courses 13, 14, 15 of acceleration in FIG. 3. The dotted course 16 represents the distance covered in case the determined longitudinal acceleration a is performed unchanged, for example transferred to the road, and the dashed course 17 represents the distance covered in case the subjective acceleration ã is performed. In the first case, i. e. the unchanged determined longitudinal acceleration, the vehicle would have covered a distance of about 170 m at the end of the time frame, i. e. after eight seconds. It is obvious that such a distance cannot be covered within the dynamometer. In the second case, when performing the subjective acceleration, the distance covered after eight seconds would already be reduced to 4 m. With shorter test runs, for example in the region of one second or below, the distance covered on the dynamometer would already be basically feasible. The continuous course 18 represents the distance covered if the subjective acceleration ã of a comparably low-frequency position control is overlaid, for example by means of a control according to FIG. 1. As is revealed, in this case the distance actually covered on the dynamometer may be reduced so much that the maximum displacement from a nominal position is about 12 cm (after approx. 0.7 seconds). Displacements in this range are particularly fit for practice and allow, for example, implementing the shaft connections between the test object and the load machines of the dynamometer by means of synchronized joint shafts.

The invention claimed is:

1. A method for simulating a behavior of a vehicle during driving in a chassis dynamometer, wherein a rotational movement carried out by a wheel or by a drive train of the vehicle is measured, and a corresponding longitudinal acceleration is determined from the measured rotational movement wherein the chassis dynamometer comprises an actuator for transferring a longitudinal force to the vehicle and for accelerating the vehicle in a longitudinal direction so that the vehicle covers a translational distance, wherein the actuator is controlled in accordance with the longitudinal acceleration determined based on the measurement, and wherein processing starting from the measurement of the rotational movement up to the control of the actuator is performed in real-time.

2. The method according to claim 1, wherein for controlling the actuator the determined longitudinal acceleration is converted into a filtered acceleration corresponding to a subjective acceleration in order to shorten the covered translational distance with respect to a distance resulting from the determined longitudinal acceleration.

3. The method according to claim 2, wherein low-frequency portions of the determined longitudinal acceleration are reduced during the conversion of the acceleration.

4. The method according to claim 2, wherein the determined longitudinal acceleration is modified by a high-pass filter for the conversion into the filtered acceleration, with a time constant of the high-pass filter being between 0.01 and 1 second.

5. The method according to claim 1, wherein a displacement of the actuator is set to a constant nominal position.

6. The method according to claim 5, wherein the displacement of the actuator is controlled by a position controller, comprising a rise time of about 0.5 seconds.

7. The method according to claim 2, wherein a portion proportional to the filtered acceleration acts on a position control circuit as a disturbance by being added to a control variable of a position controller.

8. A chassis dynamometer for simulating a behavior of a vehicle during driving having a measuring device for measuring a rotational movement of a wheel or of a drive train of the vehicle and having a control device, which is connected to the measuring device and is configured to determine a corresponding longitudinal acceleration from a measured rotational movement of the wheel obtained from the measuring device, wherein the chassis dynamometer comprises an actuator for transferring a longitudinal force to the vehicle and for accelerating the vehicle in a longitudinal direction so that the vehicle covers a translational distance, wherein the actuator is connected to the control device, wherein the control device is configured to transmit a control signal to the actuator in accordance with the determined longitudinal acceleration, wherein the measuring device and the control device are configured to measure the rotational movement and to control the actuator in real-time.

9. The chassis dynamometer according to claim 8, wherein the control device comprises a high-pass filter for the determined longitudinal acceleration, with a time constant of the high-pass filter being between 0.01 and 1 second.

10. The chassis dynamometer according to claim 8, wherein the control device comprises a position controller for controlling a displacement of the actuator, comprising a rise time between 0.05 and 5 seconds.

11. The method according to claim 4, wherein the high-pass filter is a first-order high-pass filter or a high-pass filter designed according to Bessel or Butterworth.

12. The method according to claim 4, wherein the time constant of the high-pass filter is about 0.1 seconds.

13. The method according to claim 5, wherein the constant nominal position is in the middle of an intended travel of the actuator.

14. The method according to claim 6, wherein a portion proportional to the filtered acceleration acts on a position control circuit as a disturbance by being added to a control variable of the position controller.

15. The chassis dynamometer according to claim 9, wherein the high-pass filter is designed according to Bessel or Butterworth or is a first order high-pass filter.

16. The chassis dynamometer according to claim 9, wherein the time constant of the high-pass filter is about 0.1 seconds.

17. The chassis dynamometer according to claim 9, wherein the control device comprises a position controller for controlling a displacement of the actuator, comprising a rise time between 0.05 and 5 seconds.

18. The chassis dynamometer according to claim 10, wherein the rise time is about 0.5 seconds.

19. The chassis dynamometer according to claim 17, wherein the rise time is about 0.5 seconds.

* * * * *